(12) United States Patent
Scheinkman

(10) Patent No.: US 7,062,530 B2
(45) Date of Patent: Jun. 13, 2006

(54) BROWSER WITH MESSAGING CAPABILITY AND OTHER PERSISTENT CONNECTIONS

(75) Inventor: Luiz Scheinkman, San Jose, CA (US)

(73) Assignee: SAP AG, Walldorf (DE)

( * ) Notice: Subject to any disclaimer, the term of this patent is extended or adjusted under 35 U.S.C. 154(b) by 539 days.

(21) Appl. No.: 10/145,594

(22) Filed: May 13, 2002

(65) Prior Publication Data

US 2003/0005129 A1  Jan. 2, 2003

Related U.S. Application Data

(60) Provisional application No. 60/290,545, filed on May 11, 2001.

(51) Int. Cl.
*G06F 15/16* (2006.01)

(52) U.S. Cl. ...................... 709/203; 709/219

(58) Field of Classification Search ........ 709/200–203, 709/217–227
See application file for complete search history.

(56) References Cited

U.S. PATENT DOCUMENTS

| | | | |
|---|---|---|---|
| 6,256,739 B1 | 7/2001 | Skopp et al. | |
| 6,266,681 B1 * | 7/2001 | Guthrie | 715/501.1 |
| 6,317,761 B1 | 11/2001 | Landsman et al. | |
| 6,327,628 B1 | 12/2001 | Anuff et al. | |
| 6,389,460 B1 | 5/2002 | Stewart et al. | |
| 6,493,733 B1 * | 12/2002 | Pollack et al. | 715/513 |
| 6,560,607 B1 * | 5/2003 | Lassesen | 707/101 |
| 6,615,233 B1 * | 9/2003 | Davis et al. | 709/203 |
| 2002/0032701 A1 * | 3/2002 | Gao et al. | 707/513 |
| 2002/0129064 A1 * | 9/2002 | Guthrie | 707/513 |
| 2002/0161634 A1 * | 10/2002 | Kaars | 705/14 |

OTHER PUBLICATIONS

Mogul, J.C., "The Case for Persistent-Connection HTTP," *ACM Sigcomm Computer Communication Review*, 25(4):299-313 (1995).

* cited by examiner

*Primary Examiner*—Moustafa M. Meky
(74) *Attorney, Agent, or Firm*—Townsend and Townsend and Crew LLP

(57) ABSTRACT

In an HTTP client-server system, an HTTP client requests an HTML document containing a persistent display element and using components available to the HTTP client for processing HTML documents, processes the requested HTML document including instantiating an instance of the persistent display element, whereby the persistent display element instance maintains a connection to an event source. When an event is received from the event source over the connection to the persistent display element instance, the received event is processed to form a change of at least a portion of a display of the HTTP client, which is displayed on the display of the HTTP client.

15 Claims, 3 Drawing Sheets

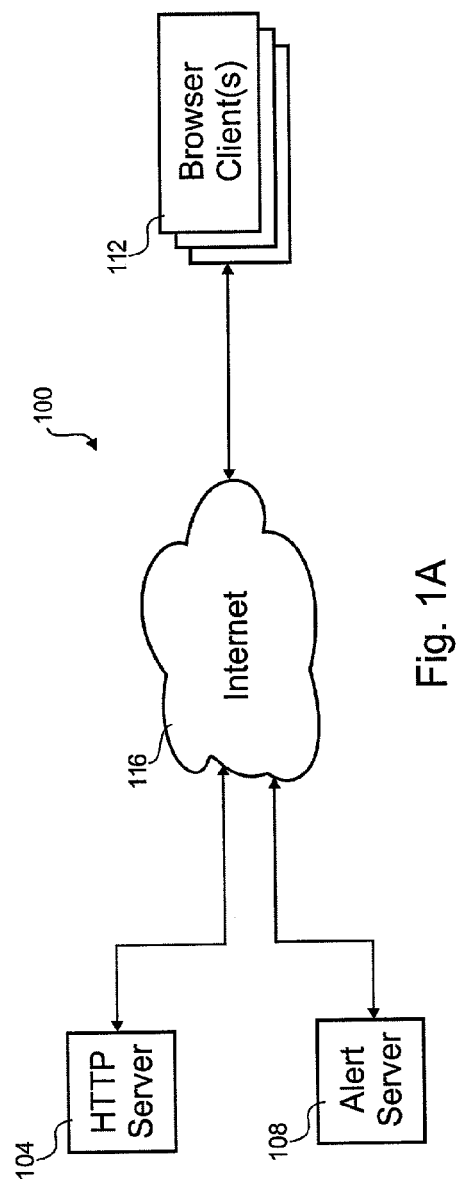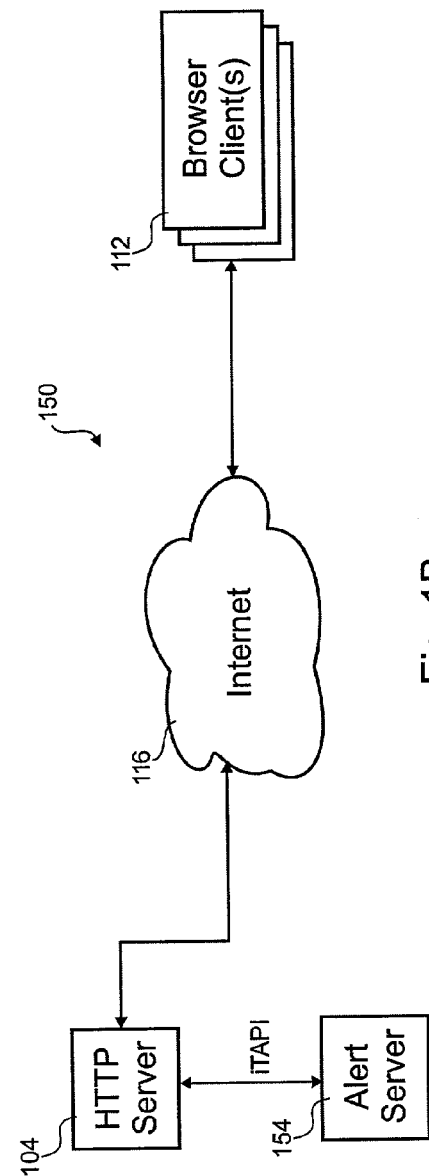

BROWSER WITH MESSAGING CAPABILITY AND OTHER PERSISTENT CONNECTIONS

BACKGROUND OF THE INVENTION

The present invention relates to user interfaces in general and in particular to a browser user interface for browsing hypertext content.

The typical system for browsing hypertext content includes a browser that makes requests, as an HTTP (HyperText Transport Protocol) client, of an HTTP server over the global internetwork of networks known as "the Internet" using an underlying protocol known as TCP/IP (Transport Control Protocol/Internet Protocol). Often, an information provider sets up the HTTP server and the information provider allows user preferences to guide the information provided. An information seeker might access the information provided by the information provider by directing the seeker's browser (or other HTTP client) to retrieve an HTML (HyperText Markup Language), or other format, page from the HTTP server where the page is specified by a Uniform Resource Locator (URL) representing a page served by that HTTP server. A collection of static and dynamic hypertext pages available from HTTP servers connected to the Internet is often referred to as the World Wide Web ("WWW"), or "the Web" for short.

A portal operator might set up an HTTP server or HTTP server farm (the "portal server") to serve requests from clients seeking information provided by the portal operators. The HTTP server is often referred to as the portal operator's "website" because a browser (or other HTTP client) appears to "go" to a new location in the Web when the URL for the portal operator's HTTP server is specified. Thus, the act referred to as "going to a website" does not involve any movement per se, other than a change of focus of the HTTP client and a display of the HTML code representing that website.

When the HTTP client is directed to the HTTP server URL, the HTML code is downloaded. HTML code allows embedding text, images, scripts, controls, and software that are interpreted by the HTTP client. In the HTML code, a number of connections may be presented as links to objects such as images, sound or other files. Some HTTP clients can only download from a maximum of four connections at a time. Once the object is downloaded, the connection is terminated and any remaining objects are downloaded with the newly freed connection. In some circumstances, the connection remains open to receive a multi-part GIF image file (e.g., from a web cam) that is displayed in a slide-show fashion over an open connection.

The portal operator might maintain a set of preferences at the portal server for each user that has set up an account with the portal operator. Thus, if the portal provider allows the user to select or deselect categories of information, such as stock quotes, news and weather, a user that is not interested in the weather could set preferences to indicate that when that user requests a portal page from the portal server and the portal server has identified the user, the portal server should serve an HTML page that contains current stock quotes and news, but not weather. Since the page served by the portal server is customized to the user when the portal server has identified the user, the page served is often referred to as that user's portal page.

Certain pages have information that changes over time. Once an HTML page is downloaded to a HTTP client, new information stops passing between the HTTP server and the HTTP client. The user may, however, request an updated portal page by pressing the refresh button on the browser, or a script may automatically request the updated portal page after expiration of a timer. Further, the script could poll the HTTP server for new information and display that information if it changes.

There are ways to send information between computers on a real-time basis. Instant messaging and chat room programs allow people to communicate in real-time. These programs embellish the browser with ActiveX™ or Java™ controls, periodically poll the HTTP server or use software separate from the HTTP client to allow this communication.

SUMMARY OF THE INVENTION

In an HTTP client-server system, an HTTP client requests an HTML document containing a persistent display element and using components available to the HTTP client for processing HTML documents, processes the requested HTML document including instantiating an instance of the persistent display element, whereby the persistent display element instance maintains a connection to an event source. When an event is received from the event source over the connection to the persistent display element instance, the received event is processed to form a change of at least a portion of a display of the HTTP client, which is displayed on the display of the HTTP client.

BRIEF DESCRIPTION OF THE DRAWINGS

FIG. 1A is a block diagram of an embodiment of a messaging system.

FIG. 1B is a block diagram of another embodiment of a messaging system.

DESCRIPTION OF THE SPECIFIC EMBODIMENTS

Figure 2:
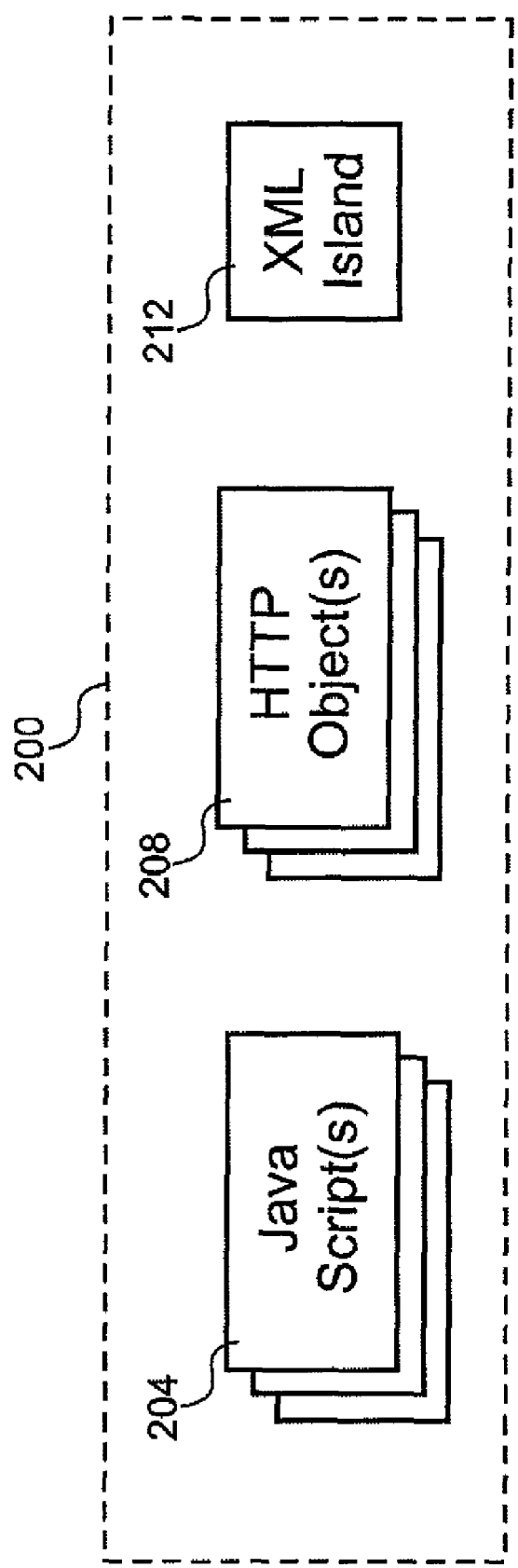
FIG. 2 is a block diagram of an embodiment of HTML code that is downloaded to a browser to display a corresponding web page.

A few examples of specific embodiments of a hypertext browsing and serving system according to the present invention are described herein. Others may become apparent after reading this description and it should be understood that the invention is not limited to these specific examples, but is limited only by the appended claims. Furthermore, while specific methods and apparatus are shown, it should be apparent upon reading this disclosure that some of the methods can be practiced using different apparatus and the apparatus shown could be used to perform different methods than shown.

This description discloses how to make and use several embodiments of a system according to the present invention, but for brevity, omits descriptions of many well-known components of such systems. For example, the operation and design of a network capable of carrying hypertext traffic, such as the Internet, the specifications of hypertext protocols, such as HTTP, for use in transporting HTML pages, the construction and operation of a browser, such as Netscape's Navigator™ browser, are not disclosed herein, since they are well described in countless readily available sources.

Using aspects of the present invention, messaging is performed between a HTTP server and a browser without requiring controls or software on the client. Without the need for software or controls on the client computer, the present invention has a zero footprint on the client computer. The HTTP server presents HTML code that includes an HTTP connection to a resource or URL that remains open after the rest of the HTML code is downloaded and displayed by the browser. The HTML code also includes scripts that react to messages sent through the open HTTP connection. Using the open connection, a message(s) is sent from the HTTP server to the browser. The scripts use the messages to update portions of the displayed web page or to perform other tasks after the scripts are triggered to act. If desired, the script can open a new connection to provide for further messaging.

Referring first to FIG. 1A, a block diagram of an embodiment of a messaging system 100 is shown. This embodiment 100 uses an alert server 108 to set up events to trigger scripts on one or more browser clients 112. These events could include updating stock quotes, instant messaging, chat room dialog, refreshing a web page, refreshing a section of a web page or other updating of a web page based upon a subscribed event. In this embodiment, the HTTP server 104, alert server 108 and browser clients 112 are coupled together with the Internet 116, but other embodiments could use any network for coupling.

The HTTP server 104 can be a standard web server that the browser 112 is pointed to in order to download the HTML code. Unique HTML code is provided to the browser, in this embodiment, by way of a portal paradigm. The alert server 108 passes information to the HTTP server 104 to indicate the events that the user associated with the browser 112 has subscribed to. With this information and other preference information, the unique HTML code is formulated by the HTTP server 104 and presented in the browser 112 as a portal page.

Referring to FIG. 1B, a block diagram of another embodiment of a messaging system 150 is shown. This embodiment couples an alert server 154 to the HTTP server 104 using an iTAPI interface or other interface. Other embodiments could merge the functionality of the alert server 154 to the HTTP server 104 in any number of ways.

With reference to FIG. 2, a block diagram is shown of an embodiment of HTML code 200 that is downloaded to a browser to display a corresponding web page. The HTML code 200 is formulated by the HTTP server 104 with the help of the alert server 154. HTTP objects 208, such as images, sound and XML (eXtensible markup Language), are included in the HTML code 200. Java™ scripts 204 are also embedded in the HTML code 200, but other embodiments could use any scripting language(s).

This embodiment uses what is defined as an XML island 212 to help maintain an open connection between the alert server 108 and the browser 112. An XML island 212 is a reference to a XML file hosted by the alert server 108 that causes a connection to open to download the XML file. The alert server 108 leaves the connection open during downloading the XML file. If the browser 112 times-out the connection, another XML island 212 is opened such that a connection is continually maintained. Any message meant for the browser 112 will travel through the connection.

Other embodiments could use different techniques to maintain this open connection without the need for special controls or software installed on the client computer. For example, the HTML code could include an image element, such as an embedded GIF or JPEG image, that has a URL that points to the alert server. To keep the connection open, the alert server would serve the "image" but never complete the image. That way, the browser maintains the connection. When a message is available, it can be sent over the open connection and processed by the browser, such as by qa script that knows the message is not to be treated as an ordinary image, but is to be treated as a message.

Figure 3:
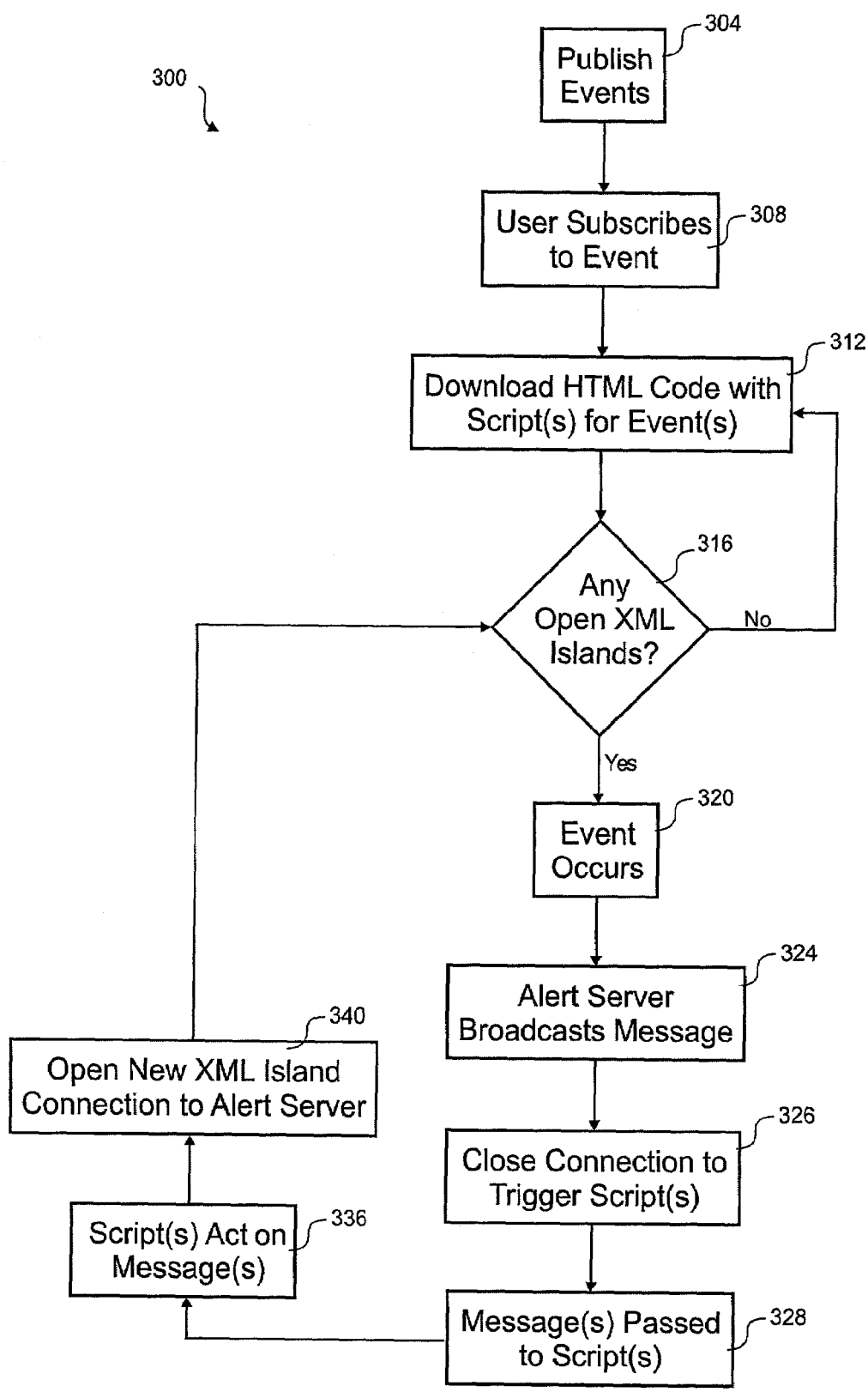
FIG. 3 is a flow diagram of an embodiment of a process for sending messages to HTML code that is interpreted by the browser to display the web page.

Referring next to FIG. 3, a flow diagram is shown of an embodiment of a process 300 for sending messages to HTML code 200 that is interpreted by the browser 112 to display the web page. The depicted portion of the process 300 begins in step 304 where events are published for the benefit of the users. In customizing the portal page, for example, the user browses the possible events and subscribes to any in step 308. Events are anything that requires passing information to the browser client 112 after a trigger occurs.

At some point after events are subscribed to, the HTML code 200 is formulated by the HTTP and alert servers 104, 108 and downloaded to the browser 112 in step 312. If there are no XML islands 212, there are no events or open connections to the alert server 154 and processing loops back from step 316 to step 312. Where there is an XML island 212, processing continues until an event occurs in step 320. The event is noted on the alert server 108 and a message is broadcast to all the browser's 112 that subscribed to the event by way of the open connection to the XML island 212 in step 324. In some embodiments, publication might come after subscription.

Once the message is sent to the subscribing browsers 112, the connection to the XML island 212 is released in step 326. Upon release, the status of the connection changes from the "readyState" to the "complete" state. The message is the content for the XML island 212. All scripts 204 that are waiting for a message from the alert server 108 trigger on the state change to read in the message from the XML island 212 in step 328. The message contains addressing information such that the proper scripts 204 are delivered the proper information. In step 336, the addressed scripts 204 process the message.

One script 204 opens a new XML island 212 and connection to the alert server 108 right after the last connection closes. This allows maintaining a connection such that message(s) can be passed soon after they occur. In some embodiments, a number of messages can be sent down a connection before the connection is closed. The alert server 108 can queue up messages and send them in groups, whereafter, closure of the connection triggers the scripts 204 to act on any sent messages of the group. Although the above discussion used the example of a portal page, other embodiments could use the zero-footprint messaging in any web page.

The above description is illustrative and not restrictive. Many variations of the invention will become apparent to those of skill in the art upon review of this disclosure. For example, instead of an XML island, the persistent connection to the alert server could be maintained with an image element. The scope of the invention should, therefore, be determined not with reference to the above description, but instead should be determined with reference to the appended claims along with their full scope of equivalents.

What is claimed is:

1. A method of passing messages from a message server to an HTTP client comprising:

sending a request, from the HTTP client to an HTTP server, for an HTML document, wherein the request includes a reference identifying the HTML document and the HTML document includes a persistent connection element;

receiving, at the HTTP server, the request;

responding to the request with HTML code representing the HTML document, wherein the HTML code includes code representing the persistent connection element, wherein the request is sent over a first server sending connection;

closing the first server sending connection;

at the HTTP client, processing the HTML code including the code representing the persistent connection element;

receiving, at the message server, a request to open a second server sending connection to the message server;

holding the second server sending connection open until a message is available at the message server for the HTTP client identified as the sender of the request to open a second server sending connection;

sending the message, once available, over the second server sending connection;

accepting at least one message from the message server over the second server sending connection; and processing the at least one message at the HTTP client.

2. The method of claim 1, wherein the message server and HTTP server are combined into a multi-function server.

3. The method of claim 1, wherein processing the HTML code comprises:

receiving the at least one message;

closing the second server sending connection;

executing instructions to reopen a connection to the message server.

4. The method of claim 1, wherein processing the at least one message at the HTTP client comprises displaying content of the message in a browser window.

5. The method of claim 1, wherein the at least one message is a group of messages.

6. The method of claim 1, wherein the HTML document is a static HTML page.

7. The method of claim 1, wherein the HTML document is a dynamically generated HTML page.

8. The method of claim 1, wherein the persistent connection element is an XML document portion.

9. The method of claim 1, wherein the persistent connection element is an image element.

10. The method of claim 9, wherein the image element is a GIF image element.

11. The method of claim 9, wherein the image element is a JPEG image element.

12. The method of claim 1, wherein the persistent connection element comprises instructions to poll the message server for the at least one message.

13. The method of claim 1, wherein the message server is an alert server.

14. The method of claim 1, wherein the message server is an instant messaging server.

15. The method of claim 1, wherein processing the at least one message at the HTTP client comprises displaying received instant messaging information.

* * * * *